(12) United States Patent
Hanussek et al.

(10) Patent No.: US 10,821,627 B2
(45) Date of Patent: Nov. 3, 2020

(54) WORK APPARATUS AND METHOD FOR OPERATING THE SAME

(71) Applicant: Andreas Stihl AG & Co. KG, Waiblingen (DE)

(72) Inventors: Sebastian Hanussek, Remseck (DE); Lukas Zuercher, Ludwigsburg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 16/125,316

(22) Filed: Sep. 7, 2018

(65) Prior Publication Data
US 2019/0070746 A1 Mar. 7, 2019

(30) Foreign Application Priority Data
Sep. 7, 2017 (DE) .................. 10 2017 008 391

(51) Int. Cl.
| | |
|---|---|
| *B23D 45/16* | (2006.01) |
| *B27G 19/04* | (2006.01) |
| *B23D 47/12* | (2006.01) |
| *B27B 5/38* | (2006.01) |
| *F16H 7/02* | (2006.01) |
| *F16H 7/12* | (2006.01) |
| *F16H 3/02* | (2006.01) |
| *F16H 7/08* | (2006.01) |

(52) U.S. Cl.
CPC ............ *B27G 19/04* (2013.01); *B23D 45/16* (2013.01); *B23D 47/12* (2013.01); *B27B 5/38* (2013.01); *F16H 7/02* (2013.01); *F16H 7/1281* (2013.01); *F16H 3/02* (2013.01); *F16H 2007/0865* (2013.01); *F16H 2007/0893* (2013.01); *F16H 2200/0034* (2013.01)

(58) Field of Classification Search
CPC ........ B27G 19/04; B23D 45/16; B23D 47/12; B27B 5/38; F16H 7/02; F16H 7/1281; F16H 3/02; F16H 2007/0865; F16H 2007/0895; F16H 2200/0034
See application file for complete search history.

(56) References Cited

U.S. PATENT DOCUMENTS

| | | | | |
|---|---|---|---|---|
| D391,973 | S | * 3/1998 | Price ......................... | D15/133 |
| 5,850,697 | A | * 12/1998 | Welch .................. | B27G 19/04 30/391 |

(Continued)

*Primary Examiner* — Andrea L Wellington
*Assistant Examiner* — Liang Dong
(74) *Attorney, Agent, or Firm* — Walter Ottesen, P.A.

(57) ABSTRACT

A work apparatus has a drive motor and a work tool driven in a rotating manner by the drive motor. The work tool is at least partially covered by a protective hood which is mounted pivotably about the rotational axis of the work tool. A control unit is provided for controlling at least one component of the work apparatus. The work apparatus has a detection unit for detecting at least one position of the protective hood. The control unit is configured for controlling the at least one component of the work apparatus depending on the detected position of the protective hood. In a method for operating a work apparatus, the detection unit detects at least one position of the protective hood and supplies the information to the control unit. The control unit activates the at least one component depending on the detected position of the protective hood.

20 Claims, 5 Drawing Sheets

(56) References Cited

U.S. PATENT DOCUMENTS

| | | | | |
|---|---|---|---|---|
| 7,131,897 B2 * | 11/2006 | Crover | ................ | B23D 45/006 |
| | | | | 451/311 |
| 2004/0060178 A1 * | 4/2004 | Willer | ..................... | B27B 9/00 |
| | | | | 30/391 |
| 2010/0269660 A1 * | 10/2010 | Janson | .................. | B27B 5/165 |
| | | | | 83/471.3 |
| 2012/0139692 A1 * | 6/2012 | Neubauer | ................ | B25F 5/00 |
| | | | | 340/5.2 |
| 2012/0165152 A1 * | 6/2012 | Tokunaga | .............. | B23D 47/12 |
| | | | | 475/159 |
| 2012/0276823 A1 * | 11/2012 | Murakami | ............ | B23Q 11/06 |
| | | | | 451/451 |
| 2015/0174674 A1 * | 6/2015 | Terashima | ........... | B23D 59/001 |
| | | | | 83/471.2 |
| 2017/0066068 A1 | 3/2017 | Hanussek et al. | | |
| 2017/0072482 A1 | 3/2017 | Hanussek et al. | | |

* cited by examiner

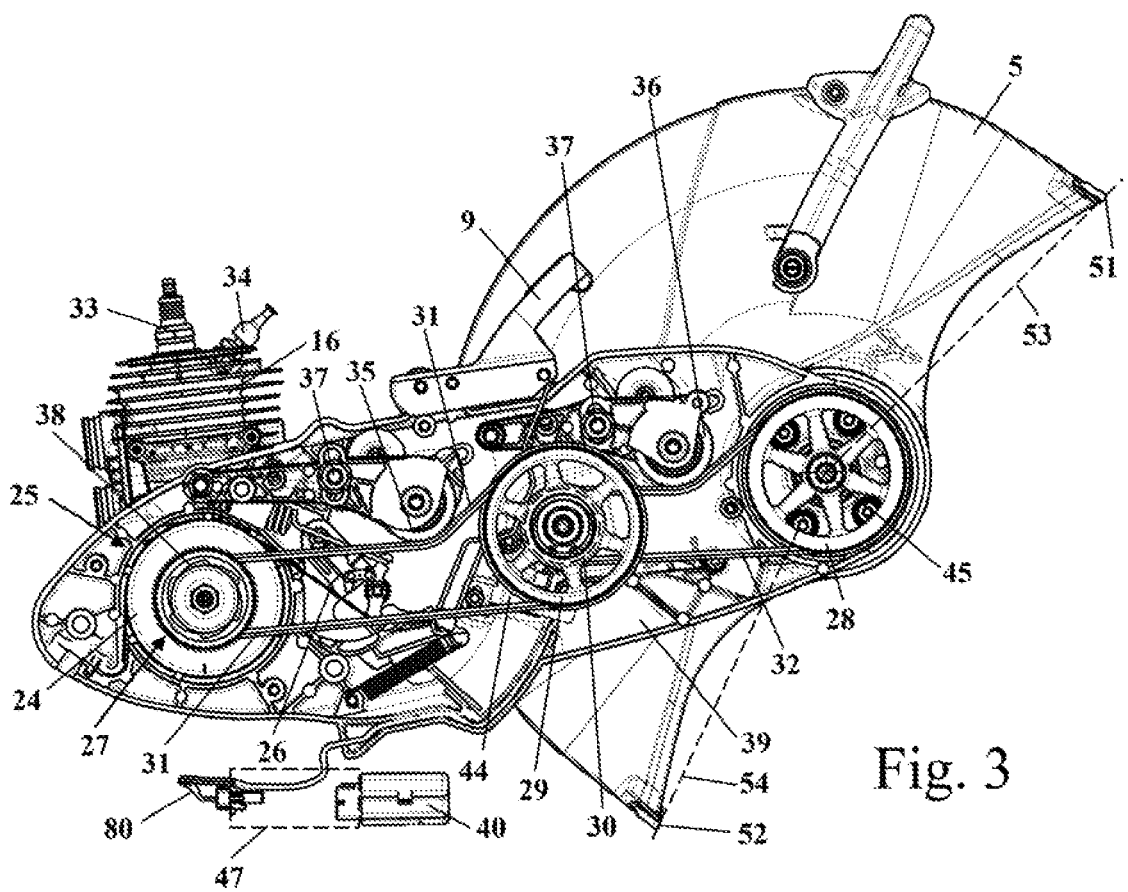

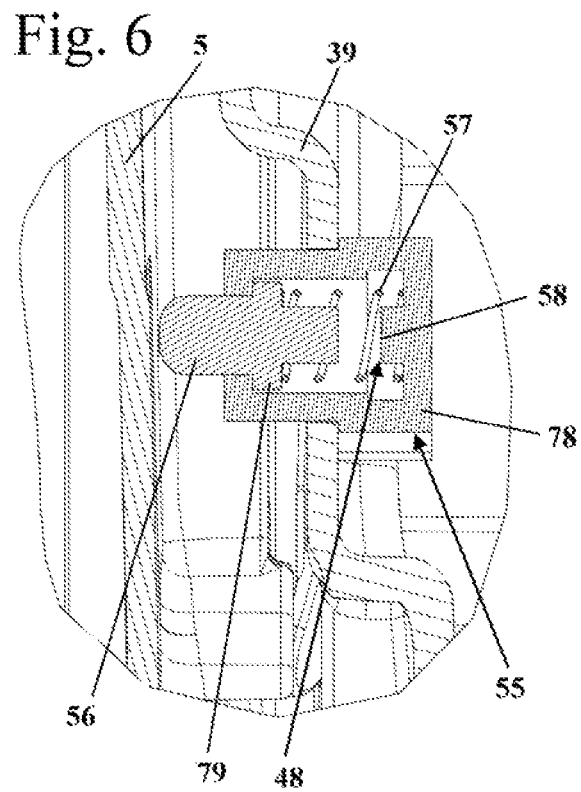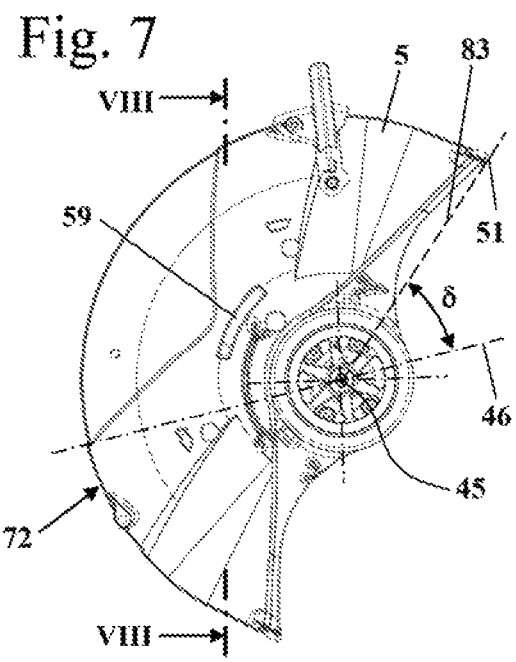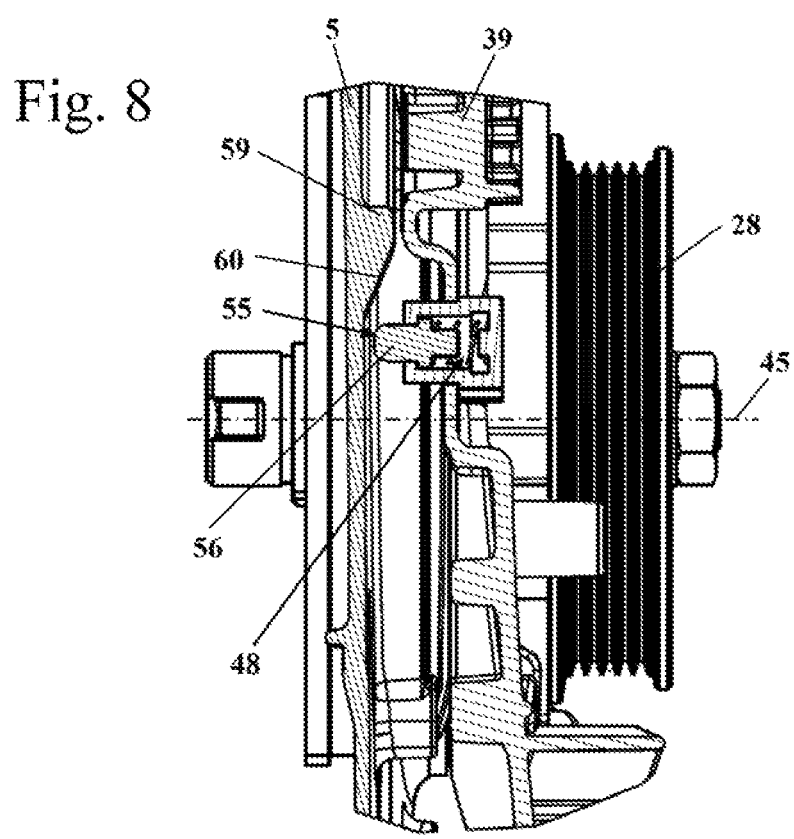

WORK APPARATUS AND METHOD FOR OPERATING THE SAME

CROSS REFERENCE TO RELATED APPLICATION

This application claims priority of German patent application no. 10 2017 008 391.6, filed Sep. 7, 2017, the entire content of which is incorporated herein by reference.

BACKGROUND OF THE INVENTION

US 2017/0066068 and US 2017/0072482 disclose a work apparatus, namely a cutoff machine. The cutoff machine drives a cutting disk via a belt drive. The belt drive here is configured in such a manner that the rotational speed of the cutting disk is lower than that of the drive motor. The cutoff machine has a brake assembly. On account of the reduced rotational speed of the cutting disk, a comparatively low moment of inertia of the cutting disk arises, and therefore a braking force of sufficient magnitude can be transmitted to the cutting disk via the belt drive.

SUMMARY OF THE INVENTION

It is an object of the invention to provide a work apparatus which permits versatile use.

The object can, for example, be achieved with a work apparatus including: a drive motor; at least one work tool configured to be driven in a rotating manner by the drive motor; a protective hood; the work tool defining a rotational axis and being at least partially covered by the protective hood; the protective hood being mounted pivotably about the rotational axis of the work tool; a control unit configured to control at least one component of the work apparatus; a detection unit configured to detect a position of the protective hood; and, the control unit being configured to control the at least one component of the work apparatus in dependence upon the detected position of the protective hood.

It is a further object of the invention to specify a method for operating a work apparatus.

This object can, for example, be achieved via a method for operating a work apparatus having a drive motor and at least one work tool driven in a rotating manner by the drive motor, the work tool being at least partially covered by a protective hood, the protective hood being mounted pivotably about the rotational axis of the work tool, the work apparatus further having a control unit for controlling at least one component of the work apparatus, and the work apparatus having a detection unit for detecting at least one position of the protective hood. The method includes the steps of: detecting a position of the protective hood via the detection unit; supplying the detected position of the protective hood to the control unit; and, controlling, via the control unit, the at least one component in dependence upon the position of the protective hood detected by the detection unit.

It is provided that the work apparatus has a detection unit for detecting at least one position of the protective hood, and the control unit is configured for controlling at least one component of the work apparatus depending on the detected position of the protective hood.

The position of the protective hood customarily varies depending on the position of the workpiece and of the work apparatus. If the work tool is moved into the workpiece from above, the protective hood is customarily largely closed, and the bottom side of the protective hood is largely exposed. In such a use situation, high rotational speeds of the work tool are customarily desirable. If the cutting disk executes a lateral cut or a cut from below, the protective hood is opened further. When the protective hood is partially open, lower rotational speeds of the work tool may be advantageous. When the protective hood is partially or completely open, it is advantageous in particular if a brake assembly of the work apparatus is active. If the work tool is destroyed and breaks, the work tool is caught by the protective hood. In order to absorb the energy released in the process, it is known to allow the protective hood to rotate after an end stop is exceeded in order to be able to dissipate the released forces. The exceeding of the end stop for the protective hood therefore provides an indicator of the presence of a broken work tool. Accordingly, it is possible, for example, to draw a conclusion regarding the working position or a destroyed work tool on the basis of the position of the protective hood. The disclosure now makes provision to use this information in order to activate at least one component of the work apparatus.

Components of the work apparatus that are activated by the control unit can in particular be a gear unit of the work apparatus, a brake assembly of the work apparatus, an ignition of an internal combustion engine of the work apparatus, or a fuel supply device, such as a fuel valve or the like. By controlling ignition and/or fuel supply device, the control unit can control, for example reduce, the rotational speed of the work apparatus. For this purpose, the ignition can be interrupted during individual engine cycles, the ignition point in time can be adjusted, the supplied quantity of fuel can be increased or reduced or the supply of fuel can be temporarily interrupted. A combination of the measures may be advantageously provided for controlling the rotational speed of the work apparatus.

In an advantageous configuration, it is provided that the control unit is configured for reducing the rotational speed of the work tool depending on the position of the protective hood that is detected by the detection unit. In order to reduce the rotational speed of the work tool, the control unit can act, for example, on the drive motor. If the drive motor is an electric motor, the rotational speed of the drive motor can be directly reduced. If the drive motor is an internal combustion engine, the detection unit can act, for example, on an ignition device or a fuel supply device, in particular a fuel valve, and can activate the same in order to reduce the rotational speed of the work tool. However, it can also be provided that the control unit activates a gear unit of the work apparatus in order to reduce the rotational speed of the work tool. The control unit is configured in particular for reducing the rotational speed of the work tool during the opening of the protective hood. During the opening of the protective hood, in particular the front edge facing away from the operator is pivoted rearward in the direction of the operator.

In an advantageous embodiment, it is provided that the detection unit is configured to detect when the protective hood is opened beyond a predetermined first operating position. The protective hood is held on an outrigger of the work apparatus. The outrigger advantageously has a longitudinal center axis. That side of the work tool which lies above the longitudinal center axis in the depositing position of the work apparatus is a top side of the work tool, and a side lying below the longitudinal center axis is a bottom side of the work tool. The longitudinal center axis divides the work tool here into the top side and the bottom side in a side view of the work apparatus with a viewing direction parallel to the axis of rotation of the work tool. In the first operating position, the connecting line of a first edge of the protection hood and of the rotational axis is inclined with respect to the longitudinal center axis of the outrigger by an angle which is measured on the top side of the work tool and at the free end of the outrigger and which is at least 45°, in particular greater than 45°. The angle is measured on the top side of the work tool. The angle is measured here in the side view of the work apparatus with a viewing direction parallel to the rotational axis of the work tool.

In an advantageous configuration, the work apparatus drives the work tool via a gear unit, wherein the gear unit is switchable. The gear unit forms a component of the work apparatus. The gear unit has at least one first switch position with a first transmission ratio, and a second switch position with a second transmission ratio. The control unit is advantageously configured for controlling the switch position of the gear unit depending on the position of the protective hood that is detected by the detection unit. A change in the rotational speed of the work tool can be achieved in a simple manner via the switchable gear unit. The gear unit is preferably an infinitely variable gear unit. The control unit is configured in particular to reduce the rotational speed of the work tool in at least one angular range of the position of the protective hood, the further the protective hood is opened. The reduction in the rotational speed can take place here continuously or in stages. Alternatively or additionally, it can be provided that the work apparatus has a selector switch for setting the transmission ratio of the gear unit. The selector switch can be provided both for an infinitely variable gear unit and for a gear unit with a defined number of switch positions.

The detection unit advantageously has at least one switch which is actuated depending on the pivoted position of the protective hood. Detection of at least one pivoted position of the protective hood is possible in a simple manner via a switch which is actuated depending on the pivoted position of the protective hood. However, a different detection of the pivoted position of the protective hood, in particular an optical or electrical detection, for example an inductive detection, may also be advantageous.

The work apparatus advantageously has a brake assembly for the work tool. The brake assembly forms a component of the work apparatus. In a preferred configuration, it is provided that the control unit is configured for deactivating the brake assembly depending on the position of the protective hood that is detected by the detection unit. It is preferably provided that the control unit deactivates the brake assembly in order to protect the brake when the protective hood is largely closed or completely closed and, in association therewith, in particular the rotational speed is correspondingly increased. In a simple configuration, it is provided that the control unit acts on an electric actuating device which holds the brake unit in an open state. In a preferred configuration, the electric actuating device is an electromagnet.

The control unit is advantageously configured to deactivate the brake assembly when the protective hood is closed at least up to the first operating position. The first operating position here is the position at which the connecting line of the first edge and of the rotational axis encloses an angle of at least 45°, in particular of greater than 45°, measured on the top side of the work tool and at the free end of the outrigger, with the longitudinal center axis of the outrigger, in a side view parallel to the rotational axis of the work tool.

In a preferred embodiment, it is provided that the control unit is provided for reducing the rotational speed of the work tool when the brake assembly is active. A reduction in the rotational speed of the work tool can take place in a simple manner by action upon a gear unit of the work apparatus or by reducing the rotational speed of the drive motor. By reducing the rotational speed of the work tool, the moment of inertia can be reduced in order to achieve safe and rapid braking of the work tool. The reduction in the rotational speed of the work tool when the brake assembly is activated can take place here alternatively or additionally to the reduction in the rotational speed depending on the position of the protective hood. The reduction in the rotational speed can take place by action upon an ignition device and/or a fuel supply device, that is, on components of the work apparatus.

When an out of service position of the protective hood is reached, it is advantageously provided that the control unit switches off the drive motor. The drive motor can be switched off in the case of an internal combustion engine in particular by switching off the ignition and/or switching off the supply of fuel. The out of service position is reached here in particular whenever the work tool is broken. In the out of service position, the protective hood is in particular in a position in which the connecting lines of the two edges of the protective hood and of the rotational axis enclose an angle of less than 45° with the longitudinal center axis. The edges of the protective hood are the edges delimiting the protective hood on the outer circumference in the circumferential direction. Accordingly, both edges of the protective hood lie at a comparatively small distance from the longitudinal center axis. In the out of service position, the protective hood predominantly covers the work tool on the bottom side. More than half of the surface of the work tool on the bottom side is covered by the protective hood in the out of service position. In the operating position, the protective hood at least partially covers the work tool, in particular predominantly on the top side. The out of service position is reached in particular upon a movement of the protective hood over or behind an end stop. In order to avoid the protective hood being moved behind the end stop during customary operation, it is advantageously provided that the end stop breaks off when a predetermined force is exceeded. Only after the end stop is broken off is a movement of the protective hood behind the end stop possible. The predetermined force at which the end stop breaks off is advantageously significantly greater here than the force customarily exerted by the operator during an adjustment of the protective hood. By the end stop breaking off, some of the energy absorbed by the protective hood is dissipated. The end stop is advantageously configured in such a manner that it can be exchanged in a simple manner.

For a method for operating a work apparatus, it is provided that the detection unit detects at least one position of the protective hood and supplies the information to the control unit, and that the control unit activates at least one component of the work apparatus depending on the position of the protective hood that is detected by the detection unit.

In a preferred configuration, the work apparatus has a brake assembly, and the control unit deactivates the brake assembly depending on the position of the protective hood that is detected by the detection unit. The brake assembly here is a component of the work apparatus that is activated by the control unit. In a particularly preferred configuration, the control unit monitors the rotational speed of the work tool and ascertains from the rotational speed of the work tool whether the brake assembly is activated.

It is advantageously provided that the control unit controls a gear unit depending on the position of the protective hood that is detected by the detection unit. The rotational speed of the work tool is advantageously reduced here when the protective hood is opened over a predetermined position. Alternatively or additionally, it is preferably provided that the rotational speed of the work tool is reduced all the more, the further the protective hood is opened. The gear unit here is a component of the work apparatus that is activated by the control unit.

In an alternative configuration, the control unit can reduce the rotational speed of the work tool during the opening of the protective hood by the rotational speed of the drive motor being reduced. If the drive motor is an internal combustion engine, the rotational speed is reduced in particular by corresponding activation of a fuel supply device and/or of an ignition device. If the drive motor is an electric motor, the electric motor can be activated directly in an electrical manner in order to reduce the rotational speed. The fuel supply device and the ignition device of the internal combustion engine or of the electric motor form components of the work apparatus that are activated by the control unit.

BRIEF DESCRIPTION OF THE DRAWINGS

The invention will now be described with reference to the drawings wherein:

FIG. 3 shows a side view of outrigger, drive motor and protective hood of the work apparatus from FIG. 1;

FIG. 4 shows a partial side view of protective hood and outrigger of the work apparatus in the second operating position;

FIG. 5 shows a partial section along the line V-V in FIG. 4, this section showing a detection unit;

FIG. 6 shows an enlarged illustration of the detection unit from FIG. 5;

FIG. 7 shows a partial side view of the protective hood in a third operating position;

FIG. 8 shows a partial section along the line VIII-VIII in FIG. 7;

DESCRIPTION OF THE PREFERRED EMBODIMENTS OF THE INVENTION

Figure 1:
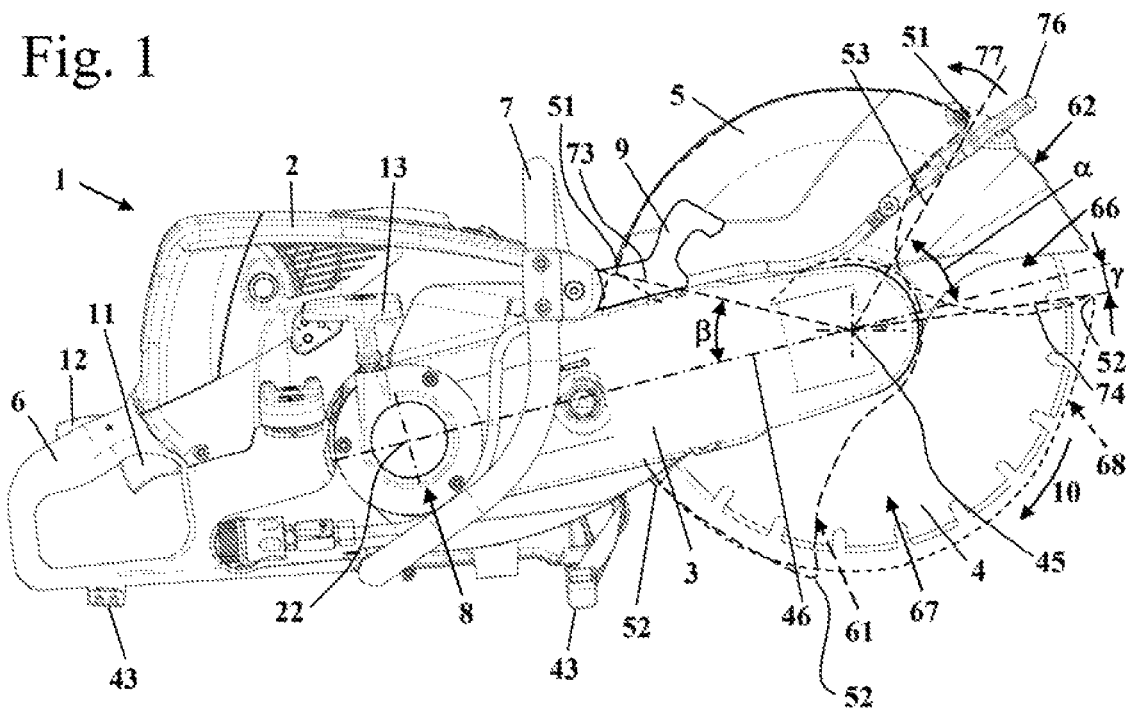
FIG. 1 shows a side view of a work apparatus with the protective hood in a second operating position.

FIG. 1 shows a handheld work apparatus, namely a cutoff machine 1, as an embodiment of a work apparatus. The cutoff machine 1 can be carried by hand or mounted on a guide carriage and pushed with the guide carriage by the operator. The cutoff machine 1 has a housing 2 to which an outrigger 3 is fastened. The outrigger 3 can be formed here partially integrally with the housing 2 or can be fastened fixedly or adjustably to the housing 2. A work tool 4, in the embodiment a cutting disk, is mounted at the free end of the outrigger 3 which faces away from the housing 2. The work tool 4 is partially covered by a protective hood 5. A handle 6 and a bale handle 7 serve for guiding the cutoff machine 1. In the embodiment, the handle 6 is a rear handle, but the handle 6 can also be an upper handle arranged on the top side of the housing 2. Operating elements, in the embodiment a throttle lever 11, and a throttle lever lock 12, are arranged on the handle 6.

A drive motor 14 (FIG. 2) is arranged in the housing 2. In the embodiment, the drive motor 14 is configured as an internal combustion engine. For starting the drive motor 14, use is made of a starter device 8, the starter handle 13 of which protrudes out of the housing 2. The drive motor 14 drives the work tool 4 in a rotating manner in a rotational direction 10. The drive motor 14 has a crankshaft 21 which is shown schematically in FIG. 2 and is driven in a rotating manner about a rotational axis 22. The work tool 4 is mounted rotatably about a rotational axis 45 which is at a distance from the rotational axis 22 and, in the embodiment, runs parallel thereto. The outrigger 3 has a longitudinal center axis 46 which intersects the rotational axes 22 and 45 in the side view, which is shown in FIG. 1, with a viewing direction parallel to the rotational axes 22 and 45. The cutoff machine 1 has a brake assembly 25, illustrated schematically in FIG. 2. In order to release the brake assembly 25, use is made of an actuating element 9, which is shown in FIG. 1 and which is arranged on the top side of the outrigger 3 in the embodiment and is configured as a lever. The expressions "top side" and "bottom side" basically relate here to the customary depositing position of the cutoff machine 1 that is shown in FIG. 1. The customary depositing position is a position in which the cutoff machine 1 is deposited on a flat horizontal depositing surface. Support feet 43 serve for depositing the cutoff machine 1.

The work tool 4 has a top side 66 which, in the customary depositing position of the cutoff machine 1 that is shown in FIG. 1, lies above the longitudinal center axis 46 in the shown side view with a viewing direction parallel to the rotational axis 45 of the work tool 4. A bottom side 67 of the work tool 4 lies below the longitudinal center axis 46.

FIG. 1 shows the protective hood 5 in a first operating position 61 with a dashed line and in a second operating position 62 with a solid line. An out of service position 68 of the protective hood 5 is likewise indicated with a dashed line. In the second operating position 62, the protective hood 5 is closed. In the second operating position 62, the protective hood 5 largely covers the top side 66 of the work tool 4. In the embodiment, the protective hood 5 covers the work tool 4 over more than 60%, in particular over more than 80%, preferably over more than 90% of its surface, in the side view shown. Complete covering of the top side 66 of the work tool 4 by the protective hood 5 can also be provided in the second operating position 62. An actuating handle 76 at which an operator can pivot the protective hood 5 about the rotational axis 45 is arranged on the protective hood 5. The second operating position 62 is provided for cutting material below the work tool 4, for example for cuts into the floor.

If material in front of or above the work tool 4 is intended to be cut, the operator pivots the protective hood 5 on the actuating handle 76 to the rear in the direction of the arrow 77, that is, in the direction of the housing 2. The protective hood 5 is open further in the first operating position 61 than in the second operating position 62. The protective hood 5 has a first edge 51 and a second edge 52. The edges 51 and 52 lie transversely with respect to the plane of the work tool 4 and connect the two sides of the protective hood 5. The sides of the protective hood lie approximately parallel to the plane of the work tool 4. The edges 51 and 52 delimit the protective hood 5 in the circumferential direction at its outer circumference. In the first operating position 61, a connecting line 53 which, in the side view shown, connects the first edge 51 to the rotational axis 45 encloses an angle α with the longitudinal center axis 46 of the outrigger 3. The angle α is measured on the top side 66 of the work tool 4 and at the free end of the outrigger 3, that is, on the side facing away from the housing 2. In the first operating position 61, the angle α is at least 45°, in particular more than 45°. In the first operating position 61, the top side 66 of the work tool 4 is free over at least a quarter of its circumference and is not covered by the protective hood 5. The free region of the circumference also encloses the region of the circumference that lies between the longitudinal center axis 46 of the outrigger 3 and the connecting line 53 and that is remote from the housing 2. On the bottom side 67, the protective hood 5 extends over at least a quarter of the circumference of the work tool 4 in the first operating position 61. On the bottom side 67, the protective hood 5 at least partially, in particular completely, covers that region of the circumference of the work tool 4 which is partially covered by the outrigger 3 and lies between the longitudinal center axis 46 of the outrigger 3 and the extension of the connecting line 53.

In the out of service position 68, the protective hood 5 has been opened beyond an end stop, not shown in FIG. 1, in the direction of the arrow 77. Such a further opening of the protective hood 5 takes place in particular when the work tool 4 breaks and is hurled into the protective hood 5. The protective hood 5 absorbs the energy of the work tool 4 and rotates a plurality of times about the rotational axis 45 in order to dissipate the energy. In such an out of service position 68, a connecting line 73 which connects the first edge 51 to the rotational axis 45 encloses an angle β with the longitudinal center axis 46. A connecting line 74 which connects the second edge 52 to the rotational axis 45 encloses an angle γ with the longitudinal center axis 46. In the out of service position 68, the angle β and the angle γ are each less than 45°, and the protective hood 5 predominantly extends on the bottom side 67 of the work tool 4. On the bottom side 67, the work tool 4 is covered over more than half of its circumference, in particular over more than 80%, in the embodiment over more than 85% of its circumference on the bottom side 67.

Figure 2:
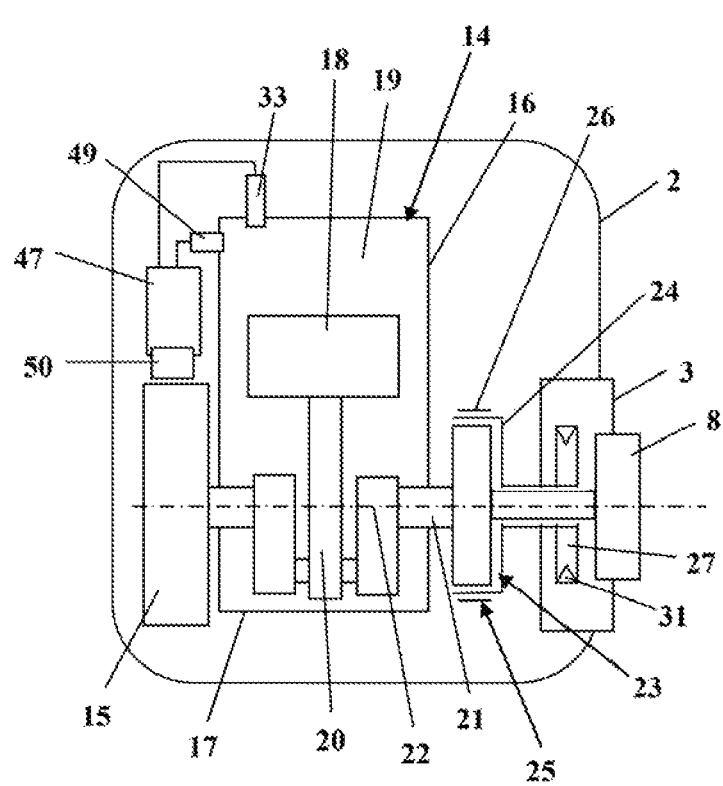
FIG. 2 shows a schematic sectional illustration of the work apparatus from FIG. 1.

FIG. 2 schematically shows the drive of the cutoff machine 1. The drive motor 14, in the embodiment an internal combustion engine, is arranged in the housing 2. The drive motor 14 may, however, also be an electric motor, in particular an electric motor supplied with energy from a battery. The drive motor 14 in the embodiment has a cylinder 16 in which a combustion chamber 19 is formed. The combustion chamber 19 is bounded by a piston 18 which drives the crankshaft 21 which is mounted rotatably about the rotational axis 22 in a crankcase 17. The piston 18 drives the crankshaft 21 via a connecting rod 20. A flywheel 15 which can be configured as a fan wheel is secured to the crankshaft 21. A rotational speed sensor 50, shown schematically, for detecting the rotational speed of the crankshaft 21 is provided adjacent to the outer circumference of the flywheel 15. The rotational speed sensor 50 can detect the rotational speed of the crankshaft 21, for example via the energy induced in an ignition module. In an alternative configuration, the rotational speed sensor 50 can also evaluate a generator signal of a generator arranged on the crankshaft 21. A different configuration and arrangement of the rotational speed sensor 50 may also be advantageous. The rotational speed sensor 50 is connected to a control unit 47.

The control unit 47 controls a spark plug 33 protruding into the combustion chamber 19, and a fuel valve 49 which supplies fuel to the drive motor 14. In the embodiment, the fuel valve 49 is shown schematically on the combustion chamber 19. A supply of fuel into the crankcase 17 or into an intake channel of the drive motor 14 may also be advantageous. Instead of the fuel valve 49, it can also be provided to introduce the fuel via a carburetor arranged on the intake channel. The fuel valve 49 and the spark plug 33 are components of the cutoff machine 1 that are controlled by the control unit 47.

The crankshaft 21 is connected via a centrifugal clutch 23 to a belt drive, the first belt pulley 27 of which is shown schematically in FIG. 2. A first drive belt 31 is guided via the belt pulley 27. A starter device 8 is arranged on that side of the belt pulley 27 which faces away from the centrifugal clutch 23. A different arrangement of the components may also be advantageous. The centrifugal clutch 23 includes a brake drum 24 about which a brake band 26 of the brake assembly 25 is guided. If the brake band 26 is tightened, the brake drum 24 and therefore also the belt pulley 27 and the drive belt 31 are braked.

FIG. 3 shows a housing part 39 of the outrigger 3. A cover of the outrigger 3 has been removed, and therefore components arranged in the outrigger 3 are visible. FIG. 3 shows the belt drive arranged in the outrigger 3 in detail. The work tool 4 is connected to a second belt pulley 28 which is coupled to a belt pulley 30 via a second drive belt 32. As FIG. 3 shows, the first drive belt 31 is guided via the belt pulley 27 and via a belt pulley 29. The belt pulleys 29 and 30 are connected to each other for rotation with each other. The output-side belt pulley 29 or 28 is in each case configured to be larger than the drive-side belt pulley 27 or 30 of a drive belt 31, 32, and therefore the rotational speed of the work tool 4 is lower than the rotational speed of the crankshaft 21.

A redirection roller 35 lies against the drive belt 31 and can be fastened in its position via a fastening unit 37 and applies a desired belt tension in the drive belt 31. In a corresponding manner, a second redirection roller 36 lies against the second drive belt 32 and can be fastened in its position via a fastening unit 37. As FIG. 3 also shows, an engagement contour 38 for engagement of the starter device 8 is formed on the brake drum 24.

FIG. 3 also shows the cylinder 16, the spark plug 33 protruding into the cylinder 16, and a decompression valve 34 provided on the cylinder 16. The control unit 47 is illustrated schematically in FIG. 3. The control unit 47 is connected to a rotational speed sensor 40 which, for the triggering of the brake assembly 25, records the rotational speed, that is, the angular acceleration of the cutoff machine 1, and can thus identify impermissible movements of the cutoff machine 1 during operation and can trigger a braking operation. The brake assembly 25 is therefore a component of the cutoff machine 1 that is controllable by the control unit 47. FIG. 3 also shows a connecting line 54 which connects the second edge 52 to the rotational axis 45.

FIG. 4 shows the protective hood 5 in the second operating position 62, that is, when the protective hood 5 is closed. As FIG. 4 shows, an end stop 69 and an elevation 59 are formed on that side of the protective hood 5 which faces the outrigger 3. As FIGS. 4 and 5 show, the elevation 59 is formed in the circumferential direction about the rotational axis 45, that is, in the shape of an arc of a circle. A detection unit 55 is arranged on the housing part 39 of the outrigger 3. As the sectional illustration in FIG. 5 shows, the detection unit 55 includes a pin 56 which is mounted on the housing part 39 so as to be movable parallel to the rotational axis 45. The pin 56 is mounted here in a sprung manner via a spring 57 shown in the enlarged illustration in FIG. 6. FIG. 5 shows the elevation 59 in detail. As FIG. 5 shows, the elevation 59 has, on an end side, a ramp 60 over which the pin 56 slides during the opening of the protective hood 5.

As FIG. 6 shows, a holder 78 in which the pin 56 is held and guided is arranged on the protective hood 5. The pin 56 has an encircling collar 79 which secures the end position of the pin 56. The pin 56 is pressed by the spring 57 into the end position secured by the collar 79. A contact 58 is formed on the holder 78.

If the pin 56 lies against the contact 58, the electrical contact 58 is contacted and conducts a corresponding signal to the control unit 47 (FIG. 3). The electrical connection is not illustrated in detail in the figures but rather corresponds to the customary connection. Corresponding insulations are also not shown in detail. The pin 56 and the contact 58 therefore form an electrical switch 48 which is actuated during opening of the protective hood 5.

FIGS. 7 and 8 show the arrangement directly before the closing of the switch 48. As FIG. 8 shows, the pin 56 is arranged directly adjacent to the ramp 60 and is actuated upon a further opening movement of the protective hood 5, as a result of which the switch 48 is closed. In FIGS. 7 and 8, the protective hood 5 is in a third operating position 72 which is located directly in front of the first operating position 61 with respect to the opening direction of the protective hood 5, which is defined by the arrow 77 in FIG. 1.

Figure 9:
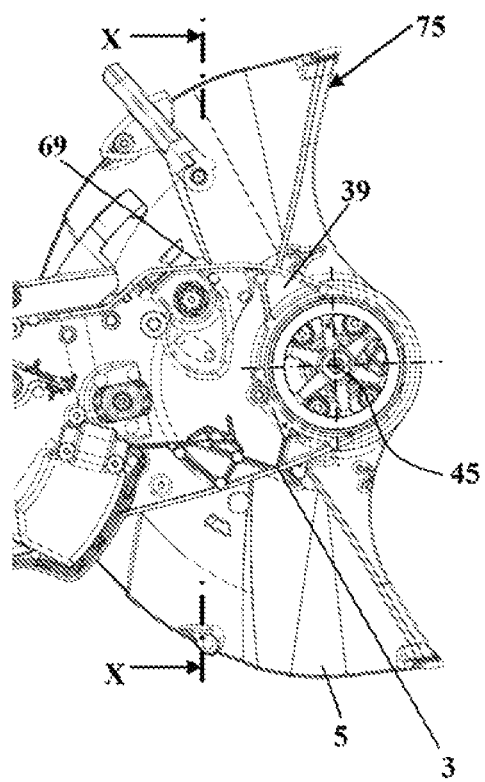
FIG. 9 shows a partial side view of the protective hood and of the outrigger in a fourth operating position.
Figure 10:
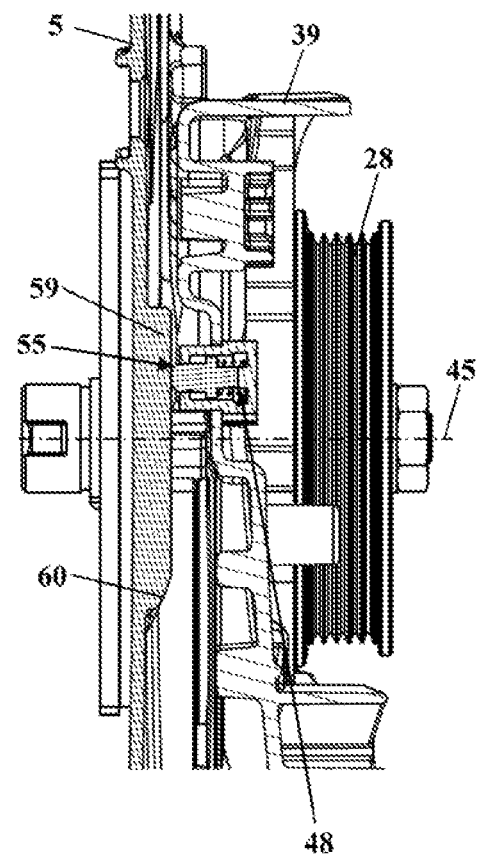
FIG. 10 shows a partial section along the line X-X in FIG. 9.
Figure 11:
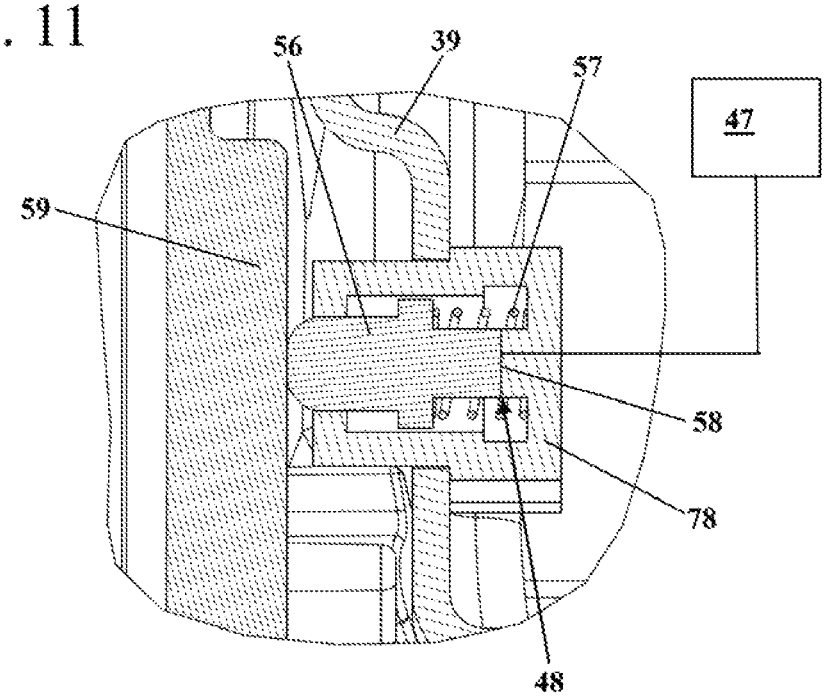
FIG. 11 shows an enlarged illustration of the detection unit from FIG. 10.

FIGS. 9 and 10 show the protective hood 5 in a fourth operating position 75 in which the switch 48 is closed. The fourth operating position 75 is located behind the first operating position 61 with respect to the opening direction of the protective hood 5. As the enlarged illustration in FIG. 11 shows, the pin 56 lies against the elevation 59 and is thereby pressed counter to the force of the spring 57 into the holder 78, that is, in the direction from the work tool 4 to the outrigger 3. The pin 56 lies against the contact 58, as a result of which the switch 48 is actuated. As FIG. 9 shows, the end stop 69 is arranged directly adjacent to the upper side of the outrigger 3. If the protective hood 5 is opened further, the end stop 69 comes into contact with a mating stop formed on the rear side of the outrigger 3, and further opening of the protective hood 5 is not possible during the application of customary forces. The end stop 69 lies against the mating stop when the protective hood is in its first operating position 61 (FIG. 1).

As FIG. 11 schematically shows, the switch 48 is connected to the control unit 47. The control unit 47 controls at least one component of the work apparatus depending on the position of the protective hood 5 detected by the detection unit 55. A component of the work apparatus here can be the brake assembly 25. The brake assembly 25 can be deactivated depending on the position of the protective hood 5. As FIG. 3 shows, the brake assembly 25 includes an electromagnet 44 which holds the brake assembly 25 in its unactuated position. The electromagnet 44 is connected to the control unit 47. For this purpose, a line 80 shown in FIG. 3 is provided. The brake assembly 25 is advantageously deactivated when the protective hood 5 is largely closed, and at least at a high rotational speed. Activation of the brake assembly 25 is advantageously provided during opening of the protective hood over the first operating position 61 (FIG. 1). In the embodiment, the brake assembly 25 is activated during the opening of the protective hood 5 between the third operating position 72 (FIG. 7) and the fourth operating position 75 (FIG. 9). In the third operating position 72, a connecting line 83 of the first edge 51 with the rotational axis 45 encloses an angle δ with the longitudinal center axis 46 of the outrigger 3. The angle δ is advantageously from 20° to 60°, in particular from 30° to 50°. The angle δ is measured here at the free end of the outrigger and on the top side 66 (FIG. 1) of the work tool 4.

Alternatively or additionally, it can be provided that the control unit 47 changes the rotational speed of the work tool 4 depending on the position of the protective hood 5 detected by the detection unit 55. The rotational speed of the work tool 4 is advantageously reduced when the protective hood 5 is opened over the first operating position 61. In order to reduce the rotational speed, the rotational speed of the drive motor can be reduced, for example by changing the ignition time of the spark plug 33 and/or by changing the quantity of fuel supplied via the fuel valve 49. A temporary interruption of the ignition and/or a temporary interruption of the supply of fuel can also be provided for controlling the rotational speed. The spark plug 33 and the fuel valve 49 are components of the cutoff machine 1 that are controlled by the control unit 47. It can also be provided that the control unit 47 reduces the rotational speed of the work tool 4 when the brake assembly 25 is active. When the out of service position 68 is reached, it is advantageously provided that the control unit 47 switches off the drive motor 14, for example by interrupting the ignition and/or switching off the supply of fuel. It is advantageously ascertained from the rotational speed of the work tool 4 whether the brake assembly 25 is active.

Figure 12:
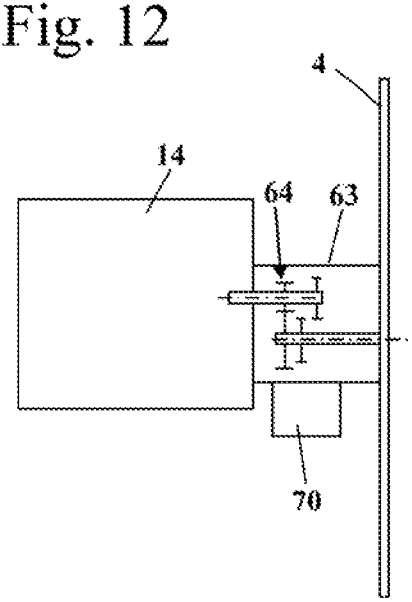
FIG. 12 shows a schematic illustration of the drive of a work apparatus with a gear unit in a first switch position.
Figure 13:
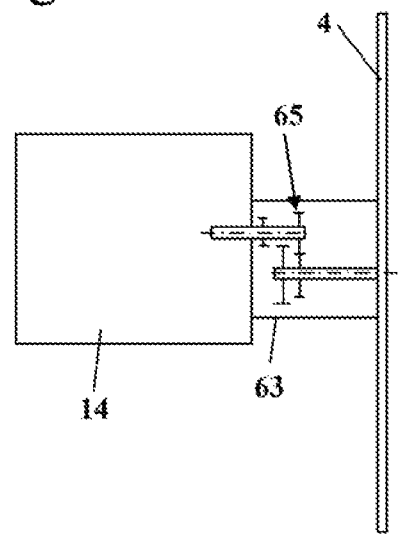
FIG. 13 shows a schematic illustration of the drive of a work apparatus with a gear unit in a second switch position; and, FIG. 14 shows a schematic illustration of the drive of a work apparatus with an infinitely variable gear unit.

FIGS. 12 and 13 schematically show a further embodiment in which the drive motor 14 drives the work tool 4 via a switchable gear unit 63. The gear unit 63 has a first switch position 64 shown in FIG. 12 and a second switch position 65 shown in FIG. 13. In the first switch position 64, the rotational speed of the work tool 4 is lower than that of the drive motor 14. In the second switch position 65, the rotational speeds of drive motor 14 and work tool 4 are approximately identical in the embodiment. The gear unit 63 has a selector switch 70 with which an operator can switch between the two switch positions 64 and 65. Alternatively or additionally, it can be provided that the control unit 47 switches the gear unit 63 depending on the position of the protective hood 5, not shown in FIGS. 12 and 13, or depending on whether the brake assembly 25 is activated or deactivated. In this case, the gear unit 63 is a component of the cutoff machine 1 that is controlled by the control unit 47.

Figure 14:
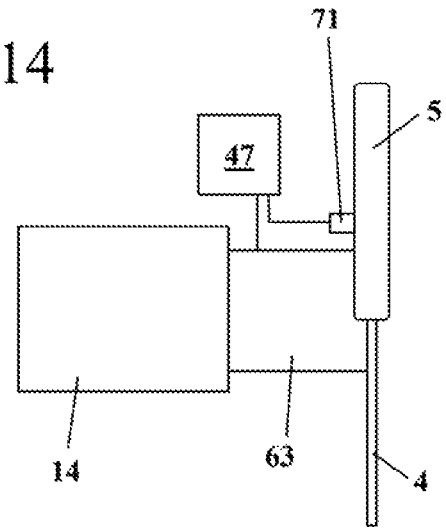

In the embodiment according to FIG. 14, an infinitely variable gear unit 63 is provided. A sensor 71 serves for detecting the position of the protective hood 5. The sensor 71 is connected to the control unit 47. The control unit 47 controls the gear unit 63 depending on the position of the protective hood 5. The rotational speed of the work tool 4 is reduced here the further the protective hood 5 is opened.

It is understood that the foregoing description is that of the preferred embodiments of the invention and that various changes and modifications may be made thereto without departing from the spirit and scope of the invention as defined in the appended claims.

What is claimed is:
1. A work apparatus comprising:
a drive motor;
at least one work tool configured to be driven in a rotating manner by said drive motor;
a protective hood;
a housing having an outrigger fixed thereon;

said outrigger having a free end and defining a longitudinal center axis;
said protective hood being held on said outrigger;
said at least one work tool having a top side disposed above said longitudinal center axis in a resting position of the work apparatus and a bottom side disposed below said longitudinal center axis;
said work tool defining a rotational axis and a circumference;
said work tool being at least partially covered by said protective hood;
said protective hood being mounted pivotably about said rotational axis of said work tool;
a control unit configured to control at least one component of the work apparatus;
a detection unit configured to detect a position of said protective hood;
said control unit being configured to reduce a rotational speed of said work tool in dependence upon the position of said protective hood that is detected by said detection unit; and,
wherein the rotational speed of said work tool is reduced to a reduced operating rotational speed by said control unit when said protective hood is pivoted such that a region of said circumference at said top side of said work tool not covered by said protective hood increases and the region is provided to engage a work piece.

2. The work apparatus of claim 1, wherein said detection unit is configured to detect when said protective hood is opened beyond a predetermined first operating position.

3. The work apparatus of claim 2, wherein said protective hood has a first edge in a viewing direction toward said rotational axis of said work tool;
said first edge and said rotational axis define a connecting line in said viewing direction toward said rotational axis of said work tool; and,
said connecting line, in said first operating position, encloses an angle (a) of at least 45°, measured on said top side of said work tool and at said free end of said outrigger, with said longitudinal center axis of said outrigger, in said viewing direction in the direction of said rotational axis of said work tool.

4. The work apparatus of claim 1 further comprising:
a gear unit;
the work apparatus being configured to drive said work tool via said gear unit;
said gear unit being switchable and defining a switch position;
said gear unit having a first switch position with a first transmission ratio and a second switch position with a second transmission ratio; and,
said control unit being configured to control said switch position of said gear unit in dependence upon the position of said protective hood detected by said detection unit.

5. The work apparatus of claim 4, wherein:
said gear unit is an infinitely variable gear unit; and,
said control unit is configured to reduce a rotational speed of said work tool in at least one angular range of the position of said protective hood the further the protective hood is opened.

6. The work apparatus of claim 4 further comprising a selector switch for setting a transmission ratio of said gear unit.

7. The work apparatus of claim 1, wherein said detection unit has at least one switch which is actuated in dependence upon a pivoted position of said protective hood.

8. The work apparatus of claim 1 further comprising a brake assembly.

9. The work apparatus of claim 8, wherein said control unit is configured to deactivate said brake assembly in dependence upon a position of said protective hood detected by said detection unit.

10. The work apparatus of claim 9, further comprising:
an electric actuating device configured to hold said brake assembly in an open position; and,
said control unit being configured to act on said electric actuating device.

11. The work apparatus of claim 9 further comprising:
an outrigger having a free end and defining a longitudinal center axis;
said protective hood being held on said outrigger;
said work tool having a top side disposed above said longitudinal center axis in a resting position of the work apparatus and a bottom side disposed below said longitudinal center axis;
said work tool having a first edge;
said first edge and said rotational axis defining a connecting line;
said connecting line, in said first operating position, enclosing an angle (a) of at least 45°, measured on said top side of said work tool and at said free end of said outrigger, with said longitudinal center axis of said outrigger, in a viewing direction in the direction of said rotational axis of said work tool; and,
said control unit being configured to activate said brake assembly when said protective hood is open at least up to said first operating position.

12. The work apparatus of claim 8, wherein said control unit is configured to reduce a rotational speed of the work tool when said brake assembly is active.

13. The work apparatus of claim 1, wherein said control unit is configured to switch off said drive motor when an out of service position of said protective hood is reached.

14. The work apparatus of claim 13, further comprising:
an outrigger defining a longitudinal center axis;
said protective hood being held on said outrigger;
said work tool having a top side disposed above said longitudinal center axis in a resting position of the work apparatus and a bottom side disposed below said longitudinal center axis;
wherein said protective hood at least partially covers said work tool on said top side during normal operation;
wherein said protective hood has edges and predominantly covers said work tool on said bottom side in an out of service position; and,
wherein connecting lines of said edges of said protective hood and of the rotational axis each enclose an angle ($\beta$, $\gamma$) of less than 45° with said longitudinal center axis in the out of service position in a viewing direction in the direction of said rotational axis of said work tool.

15. The work apparatus of claim 13, wherein said out of service position is reached when an end stop is exceeded; and, wherein the end stop breaks off when a predetermined force is exceeded.

16. The work apparatus of claim 13, wherein said drive motor is an internal combustion engine and said control unit is configured to switch off the ignition of said combustion engine.

17. The work apparatus of claim 1, wherein the work apparatus is a handheld cutoff machine and said work tool is a cutting disk.

18. A method for operating a work apparatus having a drive motor and at least one work tool driven in a rotating manner by the drive motor, the work tool being at least partially covered by a protective hood, wherein the work apparatus has a housing on which an outrigger is fixed, the outrigger having a free end and defining a longitudinal center axis, the protective hood being held on the outrigger, the work tool defining a circumference and having a top side disposed above the longitudinal center axis in a resting position of the work apparatus and a bottom side disposed below said longitudinal center axis, the protective hood being mounted pivotably about the rotational axis of the work tool, the work apparatus further having a control unit for controlling at least one component of the work apparatus, and the work apparatus having a detection unit for detecting at least one position of the protective hood, the method comprising the steps of:

detecting a position of the protective hood via the detection unit;

supplying the detected position of the protective hood to the control unit; and, reducing, via the control unit, the rotational speed of the work tool to a reduced operating rotational speed when the protective hood is pivoted such that a region of said circumference at said top side of said work tool not covered by said protective hood increases and the region is provided to engage a work piece.

19. The method of claim 18, wherein the work apparatus has a brake assembly, the method further comprising the steps of:

deactivating the brake assembly via the control unit in dependence upon the position of the protective hood that is detected by the detection unit;

monitoring a rotational speed of the work tool via the control unit; and, determining from the rotational speed of the work tool whether the brake assembly is activated.

20. A work apparatus comprising:

a drive motor;

at least one work tool configured to be driven in a rotating manner by said drive motor;

a protective hood having an actuating handle arranged thereon, wherein said actuating handle is fixedly connected to said protective hood and is immovable with respect to said protective hood; a housing;

said work tool defining a rotational axis and being at least partially covered by said protective hood;

said protective hood being mounted pivotably about said rotational axis of said work tool;

a control unit configured to control at least one component of the work apparatus;

a detection unit configured to detect a position of said protective hood;

said control unit being configured to reduce a rotational speed of said work tool in dependence upon the position of said protective hood that is detected by said detection unit; and, wherein the rotational speed of said work tool is reduced to a reduced operating rotational speed by said control unit when said protective hood and said actuating handle are pivoted together in a direction toward said housing via said actuating handle, wherein the reduced operating rotational speed is a result of the position of the protective hood.

\* \* \* \* \*